United States Patent [15] 3,671,435
Hwang [45] June 20, 1972

[54] COBALT DOPED GAMMA FERRIC OXIDE

[72] Inventor: Paul Y. Hwang, Palo Alto, Calif.

[73] Assignee: Ampex Corporation, Redwood City, Calif.

[22] Filed: July 16, 1971

[21] Appl. No.: 163,424

Related U.S. Application Data

[63] Continuation-in-part of Ser. No. 822,709, May 5, 1969, abandoned.

[52] U.S. Cl. ....252/62.56
[51] Int. Cl. ....C01g 49/06, H01f 1/00
[58] Field of Search ....252/62.56

[56] References Cited

UNITED STATES PATENTS

| | | | |
|---|---|---|---|
| 3,075,919 | 1/1963 | Gruber et al. | 252/62.56 X |
| 3,243,375 | 3/1966 | Jeschke | 252/62.56 |
| 3,278,440 | 10/1966 | Schvele | 252/62.56 |
| 3,378,335 | 4/1968 | Ellis et al. | 252/62.56 X |
| 3,399,142 | 8/1968 | Comley | 252/62.56 X |
| 3,573,980 | 4/1971 | Haller et al. | 252/62.56 X |

FOREIGN PATENTS OR APPLICATIONS

| | | |
|---|---|---|
| 41,360 | 12/1958 | Poland |

*Primary Examiner*—Tobias E. Levow
*Assistant Examiner*—J. Cooper
*Attorney*—Robert G. Clay

[57] ABSTRACT

Acicular, cobalt doped gamma ferric oxide particles suitable for magnetic recording are produced by making an aqueous paste or slurry of a cobalt salt which will decompose below 600° C. and acicular alpha FeOOH or alpha $Fe_2O_3$. The cobalt salt is decomposed to the metal or oxide form by heating the mixture. Various cobalt and iron compounds can be used as the starting materials.

4 Claims, No Drawings

COBALT DOPED GAMMA FERRIC OXIDE

REFERENCE TO RELATED APPLICATION

This application is a continuation-in-part of my application, Ser. No. 822,709 filed May 5, 1969, now abandoned.

SUMMARY OF THE INVENTION

It has been recognized that acicular, cobalt doped, gamma ferric oxide magnetic particles have superior performance in magnetic tapes as compared with the ordinary gamma ferric oxide which is normally used. Various processes have been proposed in the past for producing such cobalt doped oxides but they suffer from various disadvantages. For instance, in some of the processes, the cobalt doped particles have a cubic shape rather than the desired acicular shape. Other processes employ expensive raw materials and are therefore not of economic importance.

In accordance with the present invention, acicular cobalt doped gamma ferric oxide particles are produced by a simple process utilizing relatively inexpensive starting materials and without the employment of any complicated chemical processing.

In general, the process is carried out by forming an aqueous paste or slurry of alpha FeOOH or alpha $Fe_2O_3$ particles with a cobalt salt and then drying the paste or slurry and heat treating the thus formed particles to decompose the cobalt salt to a cobalt oxide or metallic form. The exact technique employed will depend to some extend on the starting materials. Thus, if alpha FeOOH employed as a starting material, it can first be treated with a cobalt compound and then heated to dehydrate alpha FeOOH to alpha $Fe_2O_3$ and to decompose the cobalt compound or it can first be dehydrated to alpha $Fe_2O_3$ and then treated with the desired cobalt compound and heated to decompose the cobalt compound. In either case a cobalt doped alpha $Fe_2O_3$ is formed and the product is then reduced to magnetite and reoxidized to gamma ferric oxide using known techniques.

In each case the starting iron compound is selected to have an acicular shape and the subsequent processing is such that the acicularity is preserved.

An important aspect of the present invention is that it is not necessary to employ any special technique to regulate the pH of the mixture nor to cause any chemical reaction between the cobalt compound and another material. The cobalt compound selected must be one which decomposes below 600° C. to the oxide or metal since the acicularity of the iron compound would be destroyed if it were necessary to go to a higher temperature for the decomposition. Suitable salts include cobaltous nitrate, acetate, and formate. It is not suitable to employ salts such as the chloride since these salts decompose at such a high temperature that the mass would sinter and/or acicularity would be destroyed. In the case of a paste it may be dried in a tray or rotary kiln while in the case of slurries, spray drying is an attractive technique for removing the water prior to decomposing the cobalt salt and the subsequent conversion steps.

Normally it is preferred that the cobalt doping level be about 0.5 to 25 atomic percent based on the iron present and preferably the percentage is 1.5 to 12 atomic percent. In drying the iron oxide - cobalt salt mixture, one employs suitable temperatures below 600° C. and preferably this is from 80° to 150° C. Similarly, in sintering the metallic cobalt or cobalt oxide onto the gamma ferric oxide, any temperature below 600° C. can be used and preferably this is 250° to 500° C.

The iron compound must be one having an acicular shape with a length to width (aspect) ratio of at least 1.5 to 1 and an average particle length of between 0.1 and 2.0 microns. The iron compound is selected from alpha FeOOH and alpha $Fe_2O_3$.

If the starting material is yellow iron oxide it can either first be dehydrated to alpha $Fe_2O_3$ at a temperature of 150° to 600° C. or preferably from 250° to 450° C. and then mixed with the cobalt compound or it may be directly mixed with the cobalt compound. In the latter case, the doped yellow oxide is heated to a temperature of 150° to 600° C. or preferably from 250° to 450° C. which will both decompose the cobalt salt and simultaneously convert the FeOOH to alpha $Fe_2O_3$. If the starting material is alpha $Fe_2O_3$ which is directly doped with the cobalt compound, it is then heated to a temperature sufficiently high to decompose the cobalt compound which, of course, should not be over 600° C. In both cases, one now has alpha $Fe_2O_3$ which has been doped with cobalt and this is reduced to magnetite employing temperatures below 600° C. and preferably from 250° to 450° C., in an atmosphere of hydrogen. The magnetite is then reoxidized to produce the desired cobalt doped gamma ferric oxide utilizing a gas which contains free oxygen, such as air, at temperatures below 600° C. or preferably from 100° to 500° C.

DESCRIPTION OF THE PREFERRED EMBODIMENTS

The following non-limiting examples illustrate various embodiments of the invention:

EXAMPLE 1

A yellow iron oxide, alpha FeOOH, having an average particle size of 0.8 μ in length and 0.15 μ in width, was dehydrated to alpha $Fe_2O_3$ at 375° C. Two portions of the dehydrated iron oxide, 1,500 grams each were mixed with $Co(NO_3)_2$ and a small amount of water in a mixer to give thick pastes. Another portion was merely moistened with water to serve as a control. The pastes were dried in an oven at 100° C. The alpha $Fe_2O_3$ particles were thus coated with $Co(NO_3)_2$.

The dry masses were pulverized and screened through a 32 mesh screen. The powder samples were calcined in a rotary batch kiln at 350° C. for 1 hour to decompose the $Co(NO_3)_2$ to $Co_3O_4$. The next step was to reduce the alpha $Fe_2O_3$ to $Fe_3O_4$ in an $H_2$ atmosphere at 375° C. for 2 hours. Finally, the $Fe_3O_4$—$Co_3O_4$ mixture was reoxidized in free oxygen to a cobalt doped gamma $Fe_2O_3$ at a temperature about 300° C. for 1½ hours. The products thus obtained retain the acicular particle shape of the starting iron oxide and have the following magnetic properties:

| Sample Number | 1 (Control) | 2 | 3 |
|---|---|---|---|
| Amount of $Co(NO_3)_2 \cdot 6H_2O$ per 1500 g $Fe_2O_3$ | 0 | 103.5 g | 207.0 g |
| Atomic Percent Co | 0 | 1.86 | 3.65 |
| Coercivity, $H_c$ | 225 Oe | 265 Oe | 320 Oe |
| Saturation Magnetization $\sigma_s$ | 77.7 emμ/g | 75.5 emμ/g | 78.0 emμ/g |
| Remanent Magnetization $\sigma_r$ | 22.6 emμ/g | 25.6 emμ/g | 28.2 emμ/g |

EXAMPLE 2

The sample preparation method was the same as in Example 1, except that a yellow iron oxide, alpha FeOOH, with an average particle size of 0.6 μ in length and 0.12 μ in width was used as the starting material and various percentages of cobalt were employed. The products consisted of entirely acicular particles and had the following magnetic properties:

| Sample Number | 4 | 5 | 6 | 7 | 8 |
|---|---|---|---|---|---|
| Atomic Percent Co | 0 | 2.25 | 3.5 | 5.0 | 6.5 |
| Coercivity | 235 Oe | 340 Oe | 435 Oe | 518 Oe | 560 Oe |
| Saturation Magnetization $\sigma_s$ | 74.0 | 70.5 | 73.6 | 68.2 | 71.5 |
| Remanent Magnetization $\sigma_r$ | 25.9 | 28.2 | 35.0 | 36.2 | 38.6 |

Magnetization expressed in emμ per gram

EXAMPLE 3

The sample preparation method was the same as in Examples 1 and 2, except that a yellow iron oxide, alpha FeOOH with an average particle size of 0.4 $\mu$ in length and 0.07 $\mu$ in width was used as the starting material. The product consisted of entirely acicular particles, and had the following magnetic properties:

| Sample Number | 9 | 10 |
|---|---|---|
| Atomic Percent Co. | 2.46 | 3.78 |
| Coercivity, $H_c$ | 415 Oe | 530 Oe |
| Saturation Magnetization $\sigma_s$ | 72.2 em$\mu$/g | 70.7 em$\mu$/g |
| Remanent Magnetization $\sigma_r$ | 33.9 em$\mu$/g | 39.6 em$\mu$/g |

EXAMPLE 4

The starting material, alpha FeOOH and sample preparation procedure are the same as in Example 3 except that cobaltous acetate, $Co(CH_3COO)_2 \cdot 4H_2O$ was used instead of $Co(NO_3)_2 \cdot 6H_2O$)·1,500 g of alpha $Fe_2O_3$ from the dehydration of alpha FeOOH at 350° C. were mixed with 400 ml of solution containing 186.5 g of $Co(CH_3COO)_2 \cdot 4H_2O$. The resulting paste was dried at 90° C. The dry mass was pulverized to a fine powder. The powder was charged into a kiln. The kiln was heated to 335° C. and maintained at that temperature for one-half hour to decompose the cobalt salt to $Co_3O_4$. Then the alpha $Fe_2O_3$ was reduced to $Fe_3O_4$ with $H_2$ at 300° C. Finally, the cobalt doped $Fe_3O_4$ was oxidized to a cobalt doped gamma $Fe_2O_3$ with air at a temperature about 230° C. The product had the following magnetic properties:

| | |
|---|---|
| Coercivity $H_c$ | 467 Oe |
| Saturation Magnetization $\sigma_s$ | 72.3 em$\mu$/g |
| Remanent Magnetization $\sigma_r$ | 38.4 em$\mu$/g |

Example 5

The cobalt doped acicular gamma ferric oxide samples from Example 2 were made into tapes with the following formulation and procedure.

Cobalt doped gamma ferric oxide 1,220 g; carbon black 112 g Lecithin 56 g; polyvinylidene chloride resin, 26 g; Toluene, 356 g; MEK (methyl ethyl ketone) 105 g; MIBK (methy isobutyl keton) 105 g; and THF (tetrahydrofuran) 460 g; were charged into a 5 quart pebble mill and mixed for 48 hours. Then polyvinylidene chloride resin, 131 g; polyurethane resin, 131 g; Toluene, 65 g; MEK, 45g; MIBK, 45 g; and THF, 1,306 g; were added and the mixing was continued for 24 hours. The resulting slurry was coated on 1 mil polyester film to obtain a 0.3 mil coating thickness. The web was slit to one-fourth inch width. The one-fourth inch tapes thus obtained were tested on an Ampex AG-350 type machine. The following data were obtained:

| Tape | A | B | C | D | E |
|---|---|---|---|---|---|
| Co in gamma $Fe_2O_3$ Atomic % | 0 | 2.25 | 3.5 | 5.0 | 6.5 |
| Saturation Output, with Bias | | | | | |
| at 15 mil wavelength, db. | +9.75 | +10.5 | +10.5 | +8.5 | +10.5 |
| at 3¾ mil, db. | +6.0 | +6.0 | +5.5 | +4.5 | +9.0 |
| at ¼ mil, db | −35.0 | −29.5 | −30.0 | −30.5 | −25.0 |
| Saturation Output, without Bias | | | | | |
| at 15 mil, db | +10.2 | +10.0 | +10.0 | +9.0 | +11.0 |
| at 3¾ mil, db | +6.5 | +6.0 | +6.5 | +6.5 | +9.5 |
| at ¼ mil, db | −39.0 | −28.0 | −30.0 | −29.0 | −19.5 |
| Weighted Noise, db | −46.0 | −58.0 | −58.0 | −54.0 | −55.0 |

It can be seen that tapes making use of cobalt doped gamma ferric oxides are much superior to the tapes making use of gamma ferric oxide without cobalt doping. The improvement in one-fourth mil wavelength saturation output was as much as 10 db and the improvement in weighted noise was up to 12 db.

EXAMPLE 6

About 4.5 lbs. of cobaltous acetate $Co(C_2H_3O_2)_2 \cdot 4H_2O$ was dissolved in 200 lbs. of water. Then there was added to the solution 50 lbs. of alpha FeOOH with an average particle size of 0.5 $\mu$ in length and 0.08 $\mu$ in width. The mixture was agitated to form a homogenous slurry. It was then spray-dried in a Nichols Utility Spray Dryer. The alpha $Fe_2O_3$ particles were thus coated with $CO(C_2H_3O_2)_2$.

The dry powder was calcined in a rotary batch kiln at 350° C. for 1 hour to decompose the $Co(C_2H_3O_2)_2$ to $Co_3O_4$. The next step was to reduce the alpha $Fe_2O_3$ to $Fe_3O_4$ in a $H_2$ atmosphere at 325° C. for approximately 1 ½ hours. Finally, the $Fe_3O_4$ − $Co_3O_4$ mixture was reoxidized to a cobalt doped gamma $Fe_2O_3$ in air at a temperature about 300° C. for 1 ½ hours. The product thus obtained retained the acicular particle shape of the starting iron oxide and had the following magnetic properties:

| | |
|---|---|
| Atomic % Co | 3.35 |
| Coercivity, $H_c$ | 535 Oe |
| Saturation Magnetization, $\sigma_s$ | 67.5 em$\mu$/g |
| Remanent Magnetization, $\sigma_r$ | 36.5 em$\mu$/g |

EXAMPLE 7

The process was similar to Example 6 except a quantity of 8 lbs. of Co $(C_2H_3O_2)_2$ was used to obtain a higher cobalt doping level. The product had the following magnetic properties:

| | |
|---|---|
| Atomic % Co | 5.6 |
| Coercivity, $H_c$ | 934 Oe |
| Saturation Magnetization, $\sigma_s$ | 67.3 em$\mu$/g |
| Remanent Magnetization, $\sigma_r$ | 43.8 em$\mu$/g |

I claim:

1. The process of preparing an acicular cobalt doped gamma $Fe_2O_3$ comprising:
   a. forming an aqueous mixture of an iron compound selected from the group consisting of alpha FeOOH and alpha $Fe_2O_3$ having an average particle length of between 0.1 and 2.0 microns and having a length to width ratio of at least 1.5 to 1 and a cobalt salt selected from cobalt nitrate, acetate and formate in the absence of a precipitation agent and wherein the amount of the cobalt based on the iron is from 0.5 to 25 atomic percent,
   b. drying the resulting mixture and heating said dried mixture at a temperature of from 150° C. to 600° C. to produce a cobalt doped alpha $Fe_2O_3$,
   c. heating said cobalt doped alpha $Fe_2O_3$ in a hydrogen atmosphere at a temperature of not over 600°, to produce cobalt doped $Fe_3O_4$ and
   d. heating said cobalt doped $Fe_3O_4$ in an atmosphere of free oxygen at a temperature from 100° to 600° C. to produce cobalt doped gamma $Fe_2O_3$.

2. A process in accordance with claim 1 wherein the iron compound is alpha $Fe_2O_3$.

3. The process of claim 1 wherein the iron compound is alpha FeOOH.

4. The process of claim 1 wherein the drying step (b) is conducted by spray drying.

* * * * *